US005670829A

United States Patent [19]

Susak

[11] Patent Number: 5,670,829

[45] Date of Patent: Sep. 23, 1997

[54] PRECISION CURRENT LIMIT CIRCUIT

[75] Inventor: David M. Susak, Phoenix, Ariz.

[73] Assignee: Motorola, Inc., Schaumburg, Ill.

[21] Appl. No.: 407,121

[22] Filed: Mar. 20, 1995

[51] Int. Cl.[6] ........................ B60R 21/32

[52] U.S. Cl. ........................ 307/10.1; 180/282; 280/735; 327/323

[58] Field of Search ........................ 307/10.1; 180/282; 280/735; 340/436, 669; 327/309, 323, 324, 327, 331, 538, 543, 542, 545, 546; 323/223, 225, 267, 265, 272, 271, 908; 361/18, 15

[56] References Cited

U.S. PATENT DOCUMENTS

| | | | |
|---|---|---|---|
| 5,018,041 | 5/1991 | Szepesi | 361/18 |
| 5,135,254 | 8/1992 | Masegi et al. | 280/735 |
| 5,159,516 | 10/1992 | Fujihira | 361/18 |
| 5,204,547 | 4/1993 | Schumacher et al. | 307/10.1 |
| 5,309,030 | 5/1994 | Schultz | 302/10.1 |

*Primary Examiner*—Richard T. Elms

*Attorney, Agent, or Firm*—Robert D. Atkins

[57] ABSTRACT

A current limit circuit (10) uses a reference current (28) with zero temperature coefficient. A feedback loop (18, 26, 22) maintains substantially equal $V_{GS}$ for first (22) and second (24) transistors. The reference current sets the current through the first transistor which therefore limits the current in the second transistor. The second transistor is a power device that supplies current to a squib detonation device (38) in automotive air bag application.

19 Claims, 1 Drawing Sheet

PRECISION CURRENT LIMIT CIRCUIT

BACKGROUND OF THE INVENTION

The present invention relates in general to current limit circuits and, more particularly, to a high precision current limit circuit.

Current limit circuits are commonly used in electronic design to set a predetermined limit for the current flow through a circuit. In one example, most if not all late model automobiles use air bags to restrain the occupants in the unfortunate event of a collision. The air bag is inflated by a detonation device, commonly called a squib, that fires upon sensing the collision. Many vehicles have two, four, or more air bags to protect all occupants. There is generally one squib per air bag that fires and inflates the air bag when triggered by current flow. The source of current is primarily from the automobile battery.

As a backup in case the battery is disabled during the collision, a large capacitor is maintained in a charged condition, say 20.0 volts, to supply current to fire the squibs. Since the squibs can vary in resistance, it is possible for one low resistance squib to consume a disproportional amount of available capacitor charge, leaving insufficient charge to fire the other higher resistance squibs. To ensure that all squibs fire with the available capacitor charge, a current limit circuit sources a predetermined current to each squib. That way, no one squib takes a disproportional amount of available capacitor charge.

Prior art current limit circuits typically include passive components, e.g. metal resistors, that are prone to variation over temperature. It is desirable to maintain a high precision tolerance for the current limit circuit over temperature.

Hence, a need exists for a high precision current limit circuit that operates over temperature.

DETAILED DESCRIPTION OF THE PREFERRED EMBODIMENT

Figure 1:
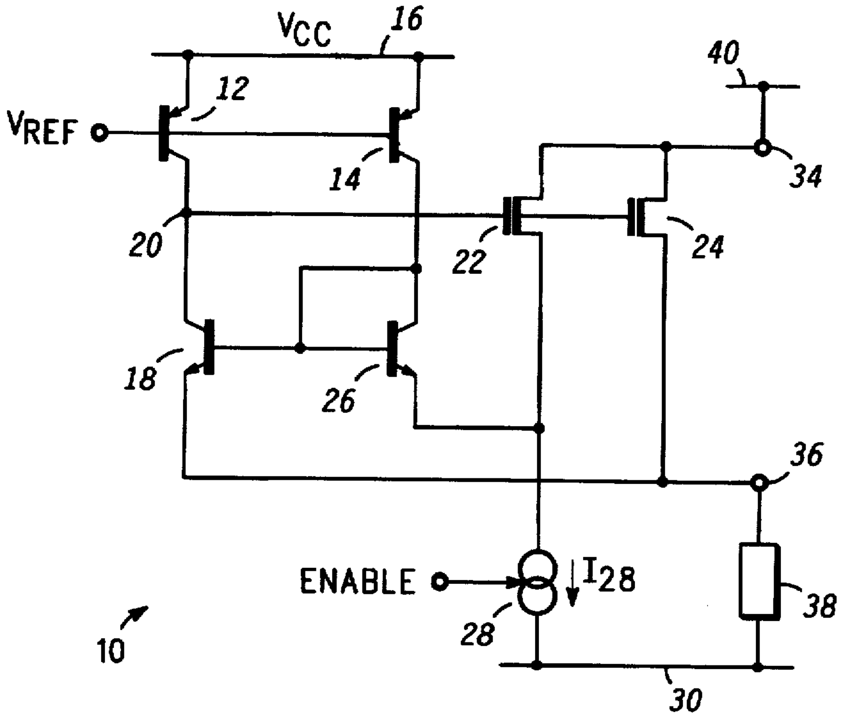
FIG. 1 is a schematic diagram illustrating a current limit circuit.

Referring to FIG. 1, a current limit circuit 10 is shown suitable for manufacturing as an integrated circuit (IC) using conventional integrated circuit processes. Current limit circuit 10 may be part of a squib control IC. Current source transistors 12 and 14 receive an 11.3 volt reference potential $V_{REF}$ at their bases. The emitters of transistors 12 and 14 are coupled to power supply conductor 16 operating at a positive power supply potential $V_{cc}$ such as 12.0 volts. The collector of transistor 12 is coupled to the collector of transistor 18 at node 20. The gates of transistors 22 and 24 are also coupled to node 20. The collector of transistor 14 is coupled to the collector and base of transistor 26 and to the base of transistor 18 to form a current mirror arrangement. Transistors 18 and 26 may be MOS devices. The emitter of transistor 26 and the source of transistor 22 are coupled to current source 28 that is referenced to power supply conductor 30 operating at ground potential.

Current source 28 is enabled with an ENABLE control signal and provides a 1.0 milliamp reference current $I_{28}$ having a zero temperature coefficient. A current source with a zero temperature coefficient is well known in the art, for example, as described in U.S. Pat. No. 4,673,867 hereby incorporated by reference. The common drains of transistors 22 and 24 are coupled to terminal 34, while the emitter of transistor 18 and the source of transistor 24 are coupled to terminal 36. Alternately, the drain of transistor 22 may be coupled to power supply conductor 16. A squib 38 is coupled between terminal 36 and power supply conductor 30. A capacitor charge source 40 is coupled to terminal 34.

The operation of current limiting circuit 10 proceeds as follows. When current source 28 is disabled, no current flows through transistor 26. Therefore, the current from current source transistor 14 flows into the base of transistor 18 thereby turning it on full and pulling node to within a saturation voltage of node 36. Consequently, the gate-source voltage ($V_{GS}$) of transistors 22 and 24 are less than their turn-on threshold. No current flows through power transistor 24 when current limit circuit 10 is disabled.

To fire squib 38, current source 28 is enabled by the ENABLE control signal to sink a reference current having a zero temperature coefficient from transistors 22 and 26. Current source 28 determines the current through transistor 22. A feedback loop is formed from the emitter of transistor 26 through the base-collector junction of transistor 18 and the gate-source junction of transistor 22 to regulate the voltage at the emitter of transistor 26 to be substantially equal to the voltage at the emitter of transistor 18. The inherent gate capacitance of transistor 24 provides compensation for the loop. Since transistors 22 and 24 share a common gate voltage at node 20, the $V_{GS}$ of transistor 22 is substantially equal to the $V_{GS}$ of transistor 24. Current source transistors 12 and 14 conduct substantially equal currents of about 10.0 microamps through transistors 18 and 26, respectively. Transistor 24 is sized 1000 times the size of transistor 22 and thus conducts 1000 times the current as transistor 22. Current source 28 operates to limit the current through transistor 22 and accordingly current limit transistor 24 to about 990.0 milliamps. When current source 28 is enabled by the ENABLE control signal, the current through transistor 24 fires squib 38 and inflates the air bag (not shown). With the zero temperature coefficient current source 28, the current limit tolerance of transistor 24 can be held to about ±8%.

Figure 2:
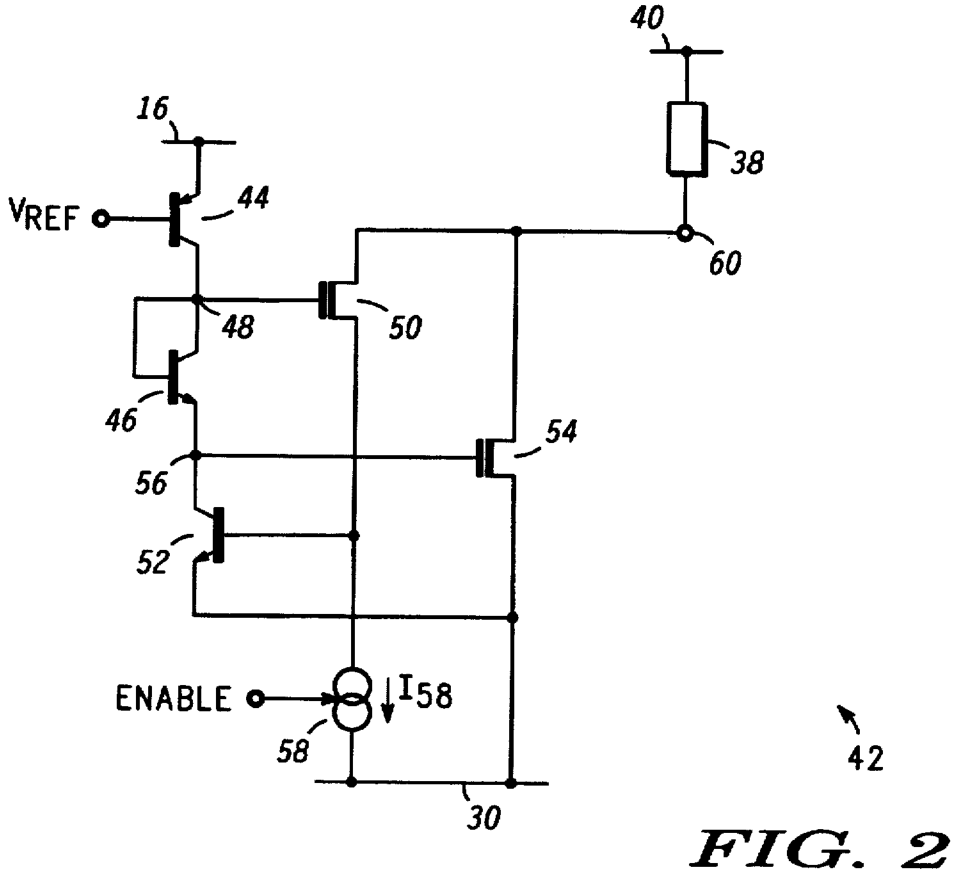
FIG. 2 is a schematic diagram illustrating an alternate embodiment of the current limit circuit.

Turning to FIG. 2, an alternate embodiment is shown as current limiting circuit 42 including current source transistor 44 receiving an 11.3 volt reference potential $V_{REF}$ at its base. The emitter of transistor 44 is coupled to power supply conductor 16 and its collector is coupled to the collector and base of diode-configured transistor 46 at node 48. The gate of transistor 50 is also coupled to node 48. The emitter of transistor 46 is coupled to the collector of transistor 52 and to the gate of transistor 54 at node 56. The gate of transistor 54 is also coupled to node 48 by way of the base-emitter junction of transistor 46. Transistors 46 and 52 may be MOS devices. Current source 58 is enabled with an ENABLE control signal and sinks a 1.0 milliamp reference current $I_{58}$ having a zero temperature coefficient from the base of transistor 52 and the source of transistor 50. Current source 58 is referenced to power supply conductor 30. The emitter of transistor 52 and source of transistor 54 are coupled to power supply conductor 30. The common drains of transistors 50 and 54 are coupled to terminal 60. Alternately, the drain of transistor 50 may be coupled to power supply conductor 16. Squib 38 is coupled between terminal 60 and capacitor charge source 40.

The operation of current limiting circuit 42 proceeds as follows. To fire squib 38, current source 58 is enabled by the ENABLE control signal to sink a reference current having a zero temperature coefficient from transistor 50. A feedback loop is formed from the base-collector junction of transistor 52 through the base-emitter junction of transistor 46 and the gate-source junction of transistor 50. The inherent gate capacitance of transistor 54 provides compensation for the loop. The voltage loop equation starting with the emitter of transistor 52 is up one base-emitter junction potential ($V_{be}$) of transistor 52 and up one $V_{GS}$ of transistor 50 and then down the $V_{be}$ of transistor 46 and down the $V_{GS}$ of transistor 54. The voltage at the gate of transistor 50 is thus one $V_{be}$ greater than the voltage at the gate of transistor 54. Likewise, the voltage at the source of transistor 50 is one $V_{be}$ greater than the voltage at the source of transistor 54. Therefore, the $V_{GS}$ of transistor 50 is substantially equal to the $V_{GS}$ of transistor 54. Current source transistor 44 conducts about 10.0 microamps of current through transistors 46 and 52. Current source 58 determines the current through transistor 50. Transistor 54 is sized 1000 times the size of transistor 50 whereby transistor 54 conducts 1000 times the current as transistor 50. Current source 58 operates to current limit transistor 50 and accordingly current limit transistor 54 to about 1000.0 milliamps. When current source 58 is enabled by the ENABLE control signal, the current through transistor 54 fires squib 38 and inflates the air bag. With the zero temperature coefficient current source 58, the current limit tolerance of transistor 54 can be held to ±8%.

In an alternate embodiment, current limit circuit 10 may be placed as a high-side drive to a squib, such as shown in FIG. 1, while current limit circuit 42 is placed as a low-side drive to the squib, such as shown in FIG. 2.

By now it should be appreciated that the present invention limits the current with active components. A feedback loop maintains substantially equal $V_{GS}$ for first and second transistors. A reference current sets the current through the first transistor which therefore limits the current in the second transistor. The second transistor is a power device that supplies current to, for example, a squib detonation device in automotive air bag application. The reference current has a zero temperature coefficient for precise tolerances.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A current limit circuit, comprising:

a first current source;

a first transistor having a gate coupled to a first node, and a drain and source conduction path coupled to an output of said first current source;

a second transistor having a gate coupled to said first node, a drain coupled to a first terminal, and a source coupled to a second terminal; and a feedback circuit coupled between said sources of said first and second transistors and said first node to maintain substantially equal gate-source voltages for said first and second transistors, said feedback circuit including, (a) a second current source, (b) a third transistor having a collector coupled to a first output of said second current source at said first node, and an emitter coupled to said second terminal, and (c) a fourth transistor having a collector and base coupled together to a second output of said second current source and to a base of said third transistor, and an emitter coupled to said output of said first current source.

2. The current limit circuit of claim 1 wherein said first current source provides a reference current with a substantially zero temperature coefficient.

3. The current limit circuit of claim 2 wherein said drain of said first transistor is coupled to said first terminal.

4. The current limit circuit of claims 3 wherein said source of said second transistor is sized a multiple times said source of said first transistor.

5. The current limit circuit of claim 1 wherein said second current source includes a fifth transistor having an emitter coupled to a first power supply conductor, a base coupled for receiving a reference potential, and a collector coupled to said first node.

6. The current limit circuit of claim 5 wherein said second current source further includes a sixth transistor having an emitter coupled to said first power supply conductor, a base coupled for receiving said reference potential, and a collector coupled to said collector and base of said fourth transistor.

7. A current limit circuit, comprising:

a first current source;

a first transistor having a gate coupled to a first node, and a drain and source conduction path coupled to an output of said first current source;

a second transistor having a gate coupled to said first node, a drain coupled to first terminal, and a source coupled to a second terminal; and a feedback circuit coupled between said sources of said first and second transistors and said first node to maintain substantially equal gate-source voltages for said first and second transistors, said feedback circuit including, (a) a second current source, (b) a third transistor having a collector and base coupled together to an output of said second current source at said first node, and a fourth transistor having a collector coupled to an emitter of said third transistor at a second node, an emitter coupled to said second terminal, and a base coupled to said output of said first current source.

8. The current limit circuit of claim 7 wherein said first current source provides a reference current with a substantially zero temperature coefficient.

9. The current limit circuit of claim 8 wherein said second current source includes a fifth transistor having an emitter coupled to a first power supply conductor, a base coupled for receiving a reference potential, and a collector coupled to said first node.

10. The current limit circuit of claim 9 wherein said source of said second transistor is sized a multiple times said source of said first transistor.

11. In a squib control integrated circuit, a current limit circuit, comprising:

first and second current sources;

a first transistor having a collector coupled to a first output of said first current source at a first node, and an emitter coupled to a first terminal;

a second transistor having a collector and base coupled together to a second output of said first current source and to a base of said first transistor, and an emitter coupled to an output of said second current source;

a third transistor having a gate coupled to said first node, and a drain and source conduction path coupled to said output of said second current source; and a fourth transistor having a drain coupled to a second terminal, a gate coupled to said first node, and a source coupled to said first terminal.

12. The current limit circuit of claim 11 wherein said second current source provides a reference current with a substantially zero temperature coefficient.

13. The current limit circuit of claim 12 wherein said first current source includes a fifth transistor having an emitter coupled to a first power supply conductor, a base coupled for receiving a reference potential, and a collector coupled to said first node.

14. The current limit circuit of claim 13 wherein said first current source further includes a sixth transistor having an emitter coupled to said first power supply conductor, a base coupled for receiving said reference potential, and a collector coupled to said collector and base of said second transistor.

15. The current limit circuit of claim 14 wherein said source of said fourth transistor is sized a multiple times said source of said third transistor.

16. A current limit circuit, comprising:

first and second current sources;

a first transistor having a collector and base coupled together to an output of said first current source at a first node;

a second transistor having a collector coupled to an emitter of said first transistor at a second node, an emitter coupled to a first terminal, and a base coupled to an output of said second current source;

a third transistor having a gate coupled to said first node, and a drain and source conduction path coupled to said output of said second current source; and a fourth transistor having a drain coupled to a second terminal, a gate coupled to said second node, and a source coupled to said first terminal.

17. The current limit circuit of claim 16 wherein said second current source provides a reference current with a substantially zero temperature coefficient.

18. The current limit circuit of claim 17 wherein said first current source includes a fifth transistor having an emitter coupled to a first power supply conductor, a base coupled for receiving a reference potential, and a collector coupled to said first node.

19. The current limit circuit of claim 18 wherein said source of said fourth transistor is sized a multiple times said source of said third transistor.

* * * * *